United States Patent
Edwards et al.

[15] 3,680,963
[45] Aug. 1, 1972

[54] APPARATUS FOR MEASURING CHANGES IN THE OPTICAL REFRACTIVE INDEX OF FLUIDS

[72] Inventors: Louis J. Edwards; Bruce D. Hopkins; Dennis D. Rice, all of Salt Lake, Utah

[73] Assignee: Hercules Incorporated, Wilmington, Del.

[22] Filed: Sept. 4, 1970

[21] Appl. No.: 69,639

[52] U.S. Cl. ............................................... 356/107
[51] Int. Cl. ............................................... G01b 9/02
[58] Field of Search ............................. 356/106–113

[56] References Cited

UNITED STATES PATENTS 3,035,482  5/1962  Kinder ........................... 356/107
3,354,311  11/1967  Vali et al. ...................... 356/107
3,472,598  10/1969  Hossman ....................... 356/107
2,568,589  9/1951  Labhart ......................... 356/107

Primary Examiner—Ronald L. Wibert
Assistant Examiner—Conrad Clark
Attorney—Michael B. Keehan

[57] ABSTRACT

Apparatus for measuring changes in the optical refractive index of fluids including an interferometer cell having compartments for the fluids. Coherent light is split and separate beams thereof are passed through each of the fluid compartments and then combined to form a single optical beam which is projected on to matched light detectors to measure the difference in the optical refractive index of the fluids in the compartments.

4 Claims, 9 Drawing Figures

LOUIS J. EDWARDS
BRUCE D. HOPKINS
DENNIS D. RICE
*INVENTORS*

LOUIS J. EDWARDS
BRUCE D. HOPKINS
DENNIS D. RICE
INVENTORS

APPARATUS FOR MEASURING CHANGES IN THE OPTICAL REFRACTIVE INDEX OF FLUIDS

This invention relates to apparatus for measuring absolute and differential changes in the optical refractive index of fluids. Such instruments are commonly called refractometers. This invention also contemplates two techniques applicable to fringe counting refractometers; vis., a method of varying refractometer sensitivity (differential fringe counting) and an electro-optical method to reduce effects of mechanical vibration.

Instruments for measuring refractive index are based primarily on two different measurement principles. A first measuring principle based on the angle of deviation technique utilizes the actual bending of a ray of light as it passes through the material to be measured. The bending angle changes as a function of the refractive index of the transmitting media and is measured by moving the light source or the light detector to maintain optical alignment, or by measuring changes in light intensity at a given spot as the light beam bends. The sensitivity of angle of deviation type refractometers is a function of the length of the light beam, or optical lines. Thus, such devices are inherently susceptible to vibration, and good mechanical insulation is required to achieve high sensitivity.

A second measuring principle on which refractometers are based involves the critical angle at a boundary. These refractometers take advantage of Fresnel's principle, which states that the intensity of the reflected component of a light beam at a boundary is inversely proportional to refractive index. To achieve sensitivity, measurements must be made at or near the critical angle. The critical angle type of refractometer measures only light intensity and is, therefore, less susceptible to vibration than the angular deviation type. Commercially available refractometers of the critical angle type are less sensitive by a factor of 50 to 100 than the angular deviation type. The critical angle type refractometers are sensitive to no more than $10^{-6}$ refractive index units.

Many organic liquids likely to be used as solvents or references in refractometers have temperature coefficients of $10^{-4}$ refractive index units per degree centigrade. Therefore, excellent thermal coupling between sample and reference will be required in any type of sensitive refractometer. For example, to achieve a sensitivity of $10^{-7}$ refractive index units will require that the temperature of sample and reference differ by no more than $1 \times 10^{-3}$° C.

The units described in accordance with the present invention are more versatile in that sensitivity is variable. They are basically more sensitive because they use fringe counting techniques. For the same reason they are more accurate. Accuracy is also increased over all other types by a method of vibration control as further described herein.

The refractometer of this invention measures changes in the refractive indices of fluids by optical fringe counting. Interference fringes are created by overlapping two coherent beams of light which have traversed different optical paths. One optical path is through an unknown sample fluid and the other is through a known reference fluid. The fringe pattern shifts in direct relation to differences between the two optical path lengths.

Since the type of refractometer described herein is capable of high sensitivity, mechanical vibrations will be important. Mechanical vibrations can cause optical path length changes. This invention describes an electro-optical method of vibration elimination. Again, because of the increased sensitivity capabilities of the described refractometers, methods are detailed herein which allow for display of wide ranges of sensitivity and also allow for variation of sensitivity.

More particularly, the present invention contemplates apparatus for measuring changes in the optical refractive index of fluids, said apparatus comprising in combination; a coherent light source; a refractometer cell comprising a reference fluid compartment for a fluid having a known index of refraction and a sample fluid compartment for a fluid having an unknown index of refraction; means for splitting the coherent light and passing separate beams through each of the fluid compartments and then combining the separate beams to form a single optical beam; means for spreading the single optical beam and projecting part of the fringe pattern thereof onto matched light detectors; and means for comparing and displaying the outputs from the matched light detectors to measure the difference in the optical refractive index of fluids in the compartments.

Other aspects of the invention will become apparent from the specification and the accompanying drawings in which.

Figure 1:
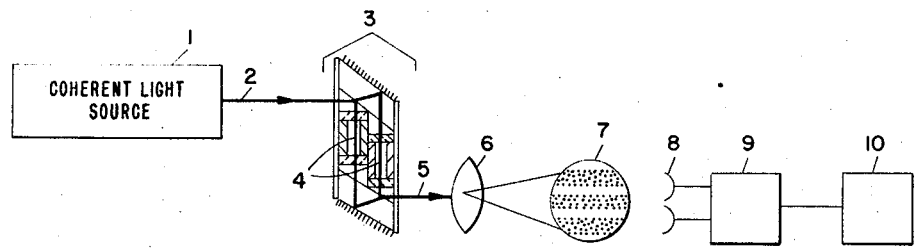
FIG. 1 is a schematic representation of refractometer apparatus according to one embodiment of this invention for measuring the index of refraction of a fluid medium.

In FIG. 1, a coherent light source 1 is shown emitting a narrow beam 2 of the light which enters a refractometer cell 3. This cell is composed of two fluid cells 4 through which split beams pass and emerge combined into one beam 5. Optics 6 are used to spread the fringe pattern 7 so that light detectors 8 can be properly positioned for signals to be inputed to a comparator 9 and displayed on an output unit 10.

Figure 2:
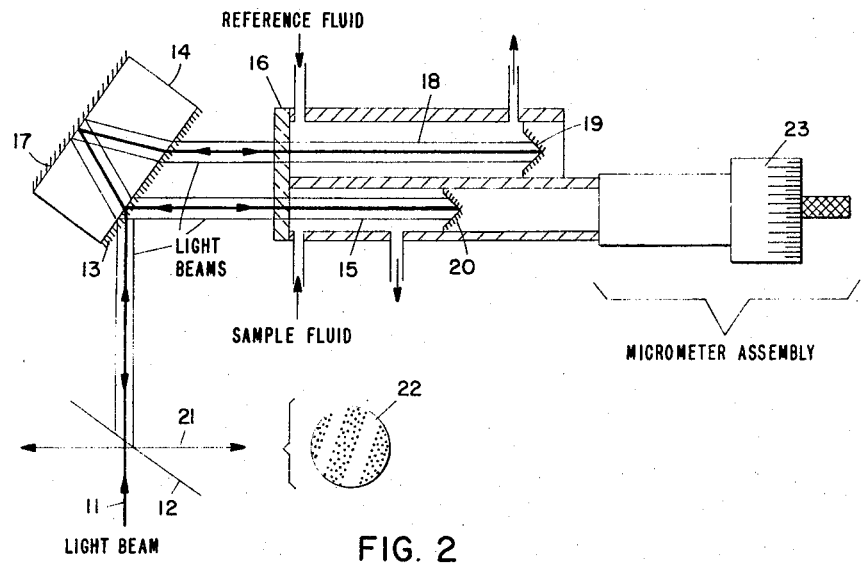
FIG. 2 is a schematic representation of the refractometer cell of FIG. 1.

A refractometer cell typical of the type referred to above is shown in FIG. 2. A coherent light beam 11 passes through a beam splitter 12. The beam splitter 12 transmits approximately one-half the beam energy while approximately one-half the energy is reflected to the left and lost. The transmitted beam impinges on the partially silvered surface 13 of a thick parallel and flat glass plate 14. The beam incident on the front surface 13 is again split at an approximate one-to-one ratio.

The reflected part enters sample cell 15 through glass cover plate 16. The transmitted part enters the thick glass 14 and is reflected from the fully silvered back surface 17 and then enters reference cell 18. The beams in both cells are reflected from retroreflectors 19 and 20. These are right angle reflectors so as to reduce off-angle retroreflections and, thus, improve fringe quality. Both reflected beams retrace their paths and join at the front surface 13 of the thick glass mirror. Parts of both beams are lost at this partially coated front surface. The remaining combined beams again divide at the beamsplitter 12 and the useful portion of the beams emerge as the final interferring beams 21 which create a fringe pattern 22.

The micrometer assembly 23 moves retroreflector 20 to change the active length of the reference cell 15 for three purposes: (a) absolute refractive index measuring, (b) differential fringe counting, and (c) variable sensitivity. Each of these are hereinafter more fully explained.

The fringe pattern spacing depends on the unparallelism of the front and back surfaces of the thick mirror. The quality (evenness) of fringes depend on the flatness of the mirror surfaces. The movement of the fringes depend on the change in the total optical path differences between the two beams. Changes in the optical path difference are desirable only within the fluid cells. Such changes outside the cells are minimized by decreasing the size of the portion of the optical paths outside the cells. Such changes are also minimized by keeping the mirror at constant temperature and by enclosing the air gap between the mirror and the glass cover plate.

Refractive index changes are indicated by fringe pattern motion. It is claimed that under reasonable conditions that fringe shifts as small as $10^{-4}$ fringe can be detected. (*Applied Optics*, 8, 103–107, Jan. 1969.) If the optical path length difference changes by one wavelength of the illuminating beam, the pattern will shift by one complete fringe. In the refractometer shown in FIG. 2 there is a physical path length difference of d between the sample and reference cells. The optical path length difference is $$L = 2nd$$

when $N$ is the refractive index of the fluid in the cell and the factor of 2 accounts for reflection back through the fluid. The change in optical path length due to a refractive index change $\Delta n$ is $$\Delta L = 2\Delta nd$$

and the phase change is:

$$\Delta\phi = (2\pi\Delta L/\lambda) = (4\pi \Delta nd/\lambda)$$

where $\lambda$ is the wavelength of the coherent beam source. Thus, when $\Delta\phi$ changes by $2\pi$, the optical path length changes by $\lambda$. A typical example is for:

$n = 1.5$
$d_1 = 1$ cm $\approx 1.66 \times 10^4 \lambda_1$ } $\Rightarrow \phi 1 = 3.4 \times 10^5$
$\lambda_1 = 0.6328$ microns ($\mu$)
$\Delta m_1 = 10^{-3}$ fringe shift where $\Delta m$ is a measure of the ability of the sensing system to detect a fractional fringe shift. The smallest detectable refractive index change is therefore:

$$\Delta n = \Delta m_1 / \phi 1 \approx 3.4 \times 10^{-8}.$$

This indicates that the possible sensitivity is great. Taking advantage of $\Delta m = 10^{-4}$ as referenced earlier and using a long cell one can reach sensitivities of $10^{-9}$.

A fringe counting interferometer is capable of readout over many orders of magnitude on standard strip recorders without resorting to logarithmic display. Only two orders of magnitude are generally read from linear graphs with any appreciable resolution; i.e., smaller changes than 1 percent are difficult to interpolate. The laser differential refractometer described herein overcomes this by changing to the frequency domain once the optical path length changes by a half wavelength or more.

Consider that the cell length is such as to give one complete fringe shift whenever the refractive index changes by $4 \times 10^{-5}$. The photocells can be positioned so that a fairly linear plot can be had from $10^{-7}$ to $10^{-5}$ refractive index change. If the refractive index changes more than $10^{-5}$ the graph begins to plot sine waves. The total number of which determines the total refractive index change. This is a method of displaying a wide range of values. Confusion can possibly exist as to whether a particular graph "peak" or "valley" corresponds to a fractional fringe shift or to a reversal of the fringes. In most cases it is easy to determine which is the case. Thus, several orders of magnitude can be relatively unambiguously displayed. The upper limit would be determined by the time rate of change of the refractive index, and the chart speed. A very high time rate of change of refractive index within the cell may cause "swirling" of the fringe pattern.

For a smoother presentation of large fringe changes an electronic fringe counting technique can be employed as suggested by the aforementioned reference or the electro-optical system for differential fringe counting as hereinafter described can be employed.

Figure 3:
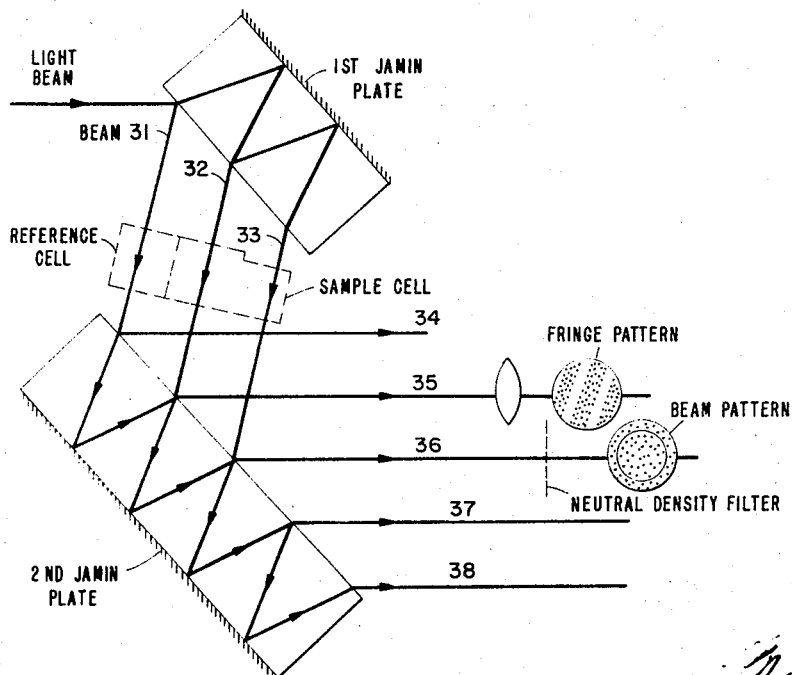
FIG. 3 is a schematic representation illustrating an optical differential fringe counting method according to the invention.

FIG. 3 is schematic of a Jamin interferometer and is used to describe the optical differential fringe counting system referred to above. In this system, beam 31 passes through the reference cell. Beam 32 goes through the longer section of a common or sample cell through which beam 33 traverses the shorter path. Consider the case where the cell length of beam 32 is 10 millimeters (mm) and that of beam 33 is 9 mm. If the refractive index changes so that the optical length in cell 32 is changed by 10 wavelengths, the optical path length in cell 33 will change by 9 wavelengths. That is, cells 32 and 33 are common cells. Beams 31 and 32 are combined into the fringe pattern of beam 35. Thus, beam 35 will show 10 complete fringe shifts for the above mentioned change. Beams 32 and 33 are combined in beam 37, which will now only show one complete fringe shift. This is caused by the fact that beams 32 and 33 follow each other closely, but not exactly. It takes 10 complete wavelength changes in the optical path length of cell of beam 32 before it differs by one complete wavelength from that in cell of beam 33. If cell of beam 32 was 100 units in length and cell of beam 33 99 units, beam 37 would indicate one fringe shift for every 100 wavelength changes in the optical path length of cell of beam 32. Thus, it is seen that virtually any ratio of differential counting can be attained by controlling the ratio of lengths in cells for beams 32 and 33.

The refractometer cell of FIG. 3 uses a pair of Jamin plates with no front surface coatings on the mirror pieces and the fluid cells are of the fixed dimension transmitting type unlike the one depicted in FIG. 2.

Figure 4:
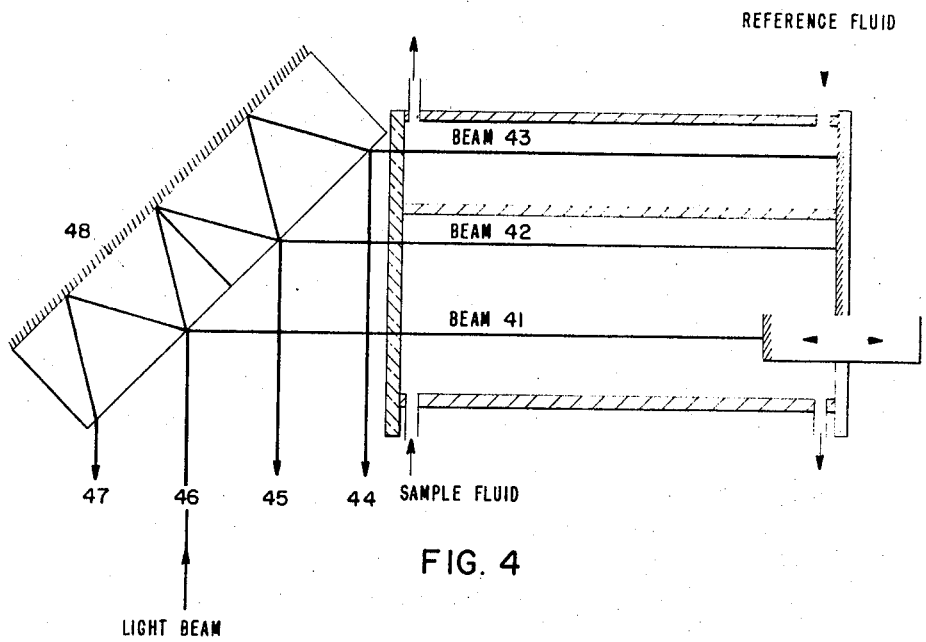
FIG. 4 is a schematic representation of a refractometer cell particularly adapted to be used in conjunction with the fringe counting of FIG. 3.

FIG. 4 shows a reflective, variable dimension type refractometer cell that can be used in the preceding differential fringe counting mode as fed from light beam 46. Beams 42 and 43 combine into beam 45 to form a fringe pattern between the reference fluid beam 43 and the sample fluid for fixed dimension cells. Beams 41 and 42 combine in beam 47 to form a fringe pattern between fixed and variable cells of the sample fluid for purposes of differential fringe counting with variable sensitivity. The front surface of the thick mirror piece 48 is uncoated and, thus, approximately 6 percent of incidence light is reflected for each beam. Thus, the fringes of beams 45 and 47 are composed of beams having nearly equal intensity which allows for good fringe visibility as long as the coherence length of light source is not exceeded.

Utility of the instrument depends on its sensitivity. The sensitivity depends on the method employed in obtaining fringes, the techniques of detecting small fringe shifts, and on ensuring that all fractional fringe shifts are true signals, not noise. One source of noise is in the relative motion between component parts of the interferometer. Two of the basic causes of this motion are temperature changes and vibration. The vibrational motion can be decreased by conventional mechanical isolation or insulation techniques. The effects of the vibrations can be minimized by solid and rigid construction and mounting of all optical components. That is, if the entire interferometer and fringe shift detection system vibrates as a unit, relative motion disappears. Temperature effects are decreased by insulating the whole split beam system from without, heat sinking it from within, and by operating in a differential mode. By differential mode it is meant that the refractometer measures an optical path length difference change between closely associated sample and reference cells. By closely associated it is meant that both cells are of nearly the same optical path length by having the same basic solvent in identical cells with good thermal contact so that temperature fluctuations occur simultaneously in both cells. The differential mode as described above is a common term applied to all types of refractometers which use two light beams in comparing a sample cell against a reference cell. To achieve the ultimate in temperature compensation the differential fringe counting method must be employed. With this method, there are no temperature fluctuation effects because both beams traverse the same fluid in a common enclosure. The only thermal effects that might arise will be due to incomplete mixing which can be designed out of the system.

The coherent light source can be uncoupled from the rigid interferometer-detector system and still give fringe stability. The procedure which allows for fringe stability despite small movements of the laser beam is described in the following. The interferometer system is fabricated and aligned for quality fringes. Reasonably flat and parallel plate glass is used for the mirror pieces. The cell windows are flat, uniformly thick glass pieces mounted parallel to each other. The detector photocells are chosen and set into a balanced configuration where they are sensitive only to intensity ratios and not to total intensity fluctuations. The system is adjusted for vertical fringes. Making the sensitive area of the photocells much smaller than the vertical length of the center fringe allows for vertical motion of the laser without detection of this motion by the photocell system. The following describes an electronic method of stabilizing vertical fringes against horizontal vibration.

In discussing control of beam vibration, reference is made to FIG. 3 (FIG. 4 could also be used). Beam 31 is formed by reflection of the incident beam from the face of the first Jamin plate. It represents about 6 percent of the intensity of the incident beam. Beam 32 is about 88 percent of the incident beam. Beam 33 is nearly 6 percent of the incident beam. Beam 34 is the reflection of beam 31 from the front surface of the second Jamin plate. It is 6 percent of beam 31, making it 0.36 percent of the incident beam intensity. Beam 35 is a "beating" (imposition) of nearly all of beam 31 and about 6 percent of beam 32 so that fringe visibility in beam 35 is nearly 1. Beam 36 is approximately 75 percent of the incident beam intensity and 6 percent each of beams 33 and 31 so that fringe visibility is essentially negligible. Beam 37 is an imposition of 6 percent of beam 32 and 88 percent of beam 33, making fringe visibility nearly 1. Thus, beam 37 is comparable in intensity to beam 35. Beams 35 or 37 can be taken as the differential fringe counting beam while the other is used for total fringe counting in the most sensitive mode. Beam 38 is 6 percent of beam 37 and is, thus, comparatively weak.

Figure 5:
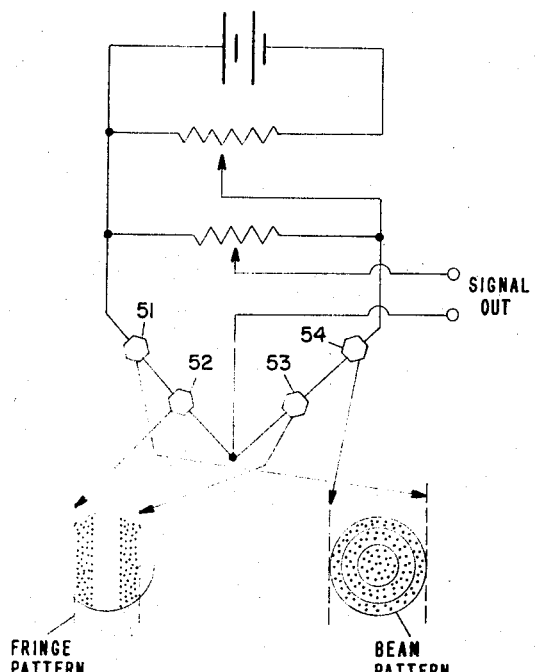
FIG. 5 is a schematic representation of a beam vibration control system according to the invention.

For vibration control beam 36 has been selected. If matched photocells are used in a configuration such as shown in FIG. 5 (beam vibration control), beam 36 of FIG. 3 will have to be reduced to the same intensity level as the fringes of beams 35 and 37. From the basic interference equation it is seen that the maximum fringe intensity is four times that of either component beam intensity if we assume equal component intensity.

$$I = 4I_1 \cos^2 \delta/2$$

where $I_1 =$ intensity of the component beams, and $\delta =$ phase difference $= 2n\pi$, $(n = 0, 1, 2, 3)$ for positions of fringe maxima.

Reference is now made to FIG. 5 depicting simple electrical circuitry where for satisfactory operation of the system light detector means in the form of photocells 52 and 53 must be matched with respect to each other and cells 51 and 54 likewise matched to each other. Then, as shown in FIG. 5, cells 52 and 53 are positioned on the opposite sides of a fringe, or two equal fringes. Cells 51 and 54 are positioned at the edges of the beam pattern. The maximum beam intensity is brought down by a neutral density filter so that it matches that of the fringe pattern. The slope of the beam is made to match that of the fringes by reducing the beam spot size with converging lenses.

Figure 6:
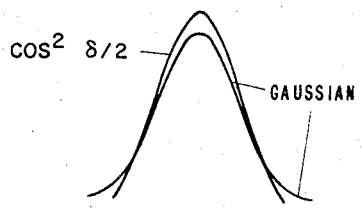
FIG. 6 depicts beam pattern shapes as related to the system of FIG. 5.

The beam pattern is Gaussian in shape as depicted in FIG. 6. That of the individual fringe is the previously mentioned $\cos^2 \delta/2$ shape. In FIG. 6 traces of both curves are shown. It will be appreciated that by attenuating the $\cos^2 \delta/2$ curve and at the same time having it widened the curve slopes can be nearly matched.

Figure 7:
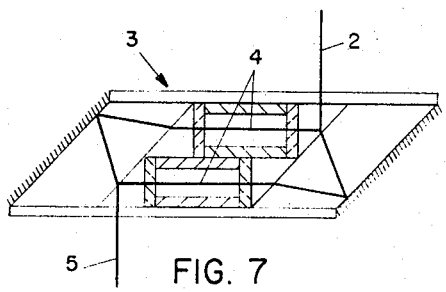
FIGS. 7, 8 and 9 are schematic representations of other embodiments of refractometer-interferometer cells which may be utilized.
Figure 8:
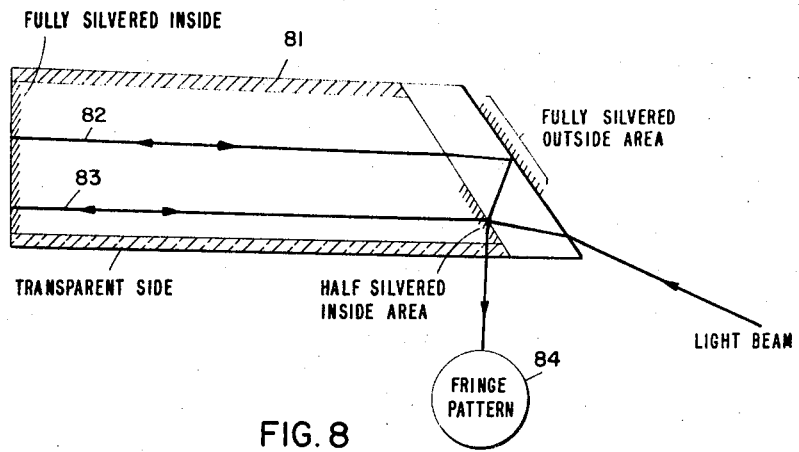
Figure 9:
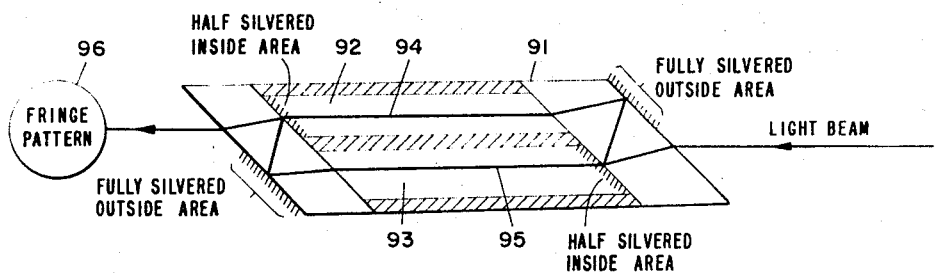

FIGS. 7 through 9 show various interferometer fluid cell configurations. FIG. 7 is a compact arrangement of two separate cells (one a sample cell and another a reference cell). The reference cell could be air or vacuum since perpendicular incidence does not allow for beam bending by refraction. FIG. 7 is an enlarged view of the cell part 3 of FIG. 1.

FIG. 8 shows a very compact interferometer and fluid cell 81. It is shown for the case of perpendicular incidence on the back plate as shown by beams 82 and 83. In reality, this only happens for one refractive index. A different index will bend the beams, but both are bent equally so the beam can be combined to give a fringe pattern 84 over a fair range of indices for conversion to a reading. This cell is a differential fringe counting cell, one in which all temperature differences are eliminated between the regions of the beam paths.

FIG. 9 is a compact unit 91 with separate reference and sample cells 92 and 93 respectively. It is essentially the same as FIG. 7, except that the reference will have to be a fluid with refractive index near to that in the sample cell (which is usually the case). Otherwise, excessive differences in indices will bend the beams unequally and prevent fringe formation. The cell of FIG. 9 has better transmission characteristics than that of FIG. 7 in that the separated optical paths 94 and 95 respectively are all within the fluids or glass and, thus, separate fluctuations and vibrations are minimized. Beam and fringe pattern intensity 96 is optimized by proper silvering in the areas indicated in FIG. 9.

The refractometer operation described thus far involves measuring changes in refractive indices. The refractometers depicted in FIGS. 2 and 4 can be used to measure absolute values of refractive index as well as changes thereof. Both of these figures show fluid cells with internal moveable mirrors. This allows for changing the length of one of the two comparative optical paths within each refractometer cell. To be able to change the length of one optical path makes it possible to vary the refractometer sensitivity and to take absolute refractive index readings.

The absolute readings are arrived at by counting the fringes per unit distance of mirror travel. The sensitivity of this method depends on the precision of the device measuring the mirror distance traveled. FIG. 2 shows a micrometer measuring device. More precision can be obtained by using another interferometer to measure travel distances. Various other devices can be imagined. The precision of measurement can be increased to a certain degree of counting fringes for increased mirror displacements. Increased travel diminishes interpolation errors due to judging fractions of fringes and of measuring units.

From the foregoing, it will be appreciated that this invention is directed to apparatus for measuring the index of refraction of a fluid by fringe pattern readout and that the system may by utilized with or without reference cells provided some other reference base is present. Photocells have been referred to in the description as the light detector means but phototubes and the like may be used also.

What we claim and desire to protect by Letters Patent is:

1. Apparatus for measuring changes in the optical refractive index of fluids, said apparatus comprising in combination:
   a. a coherent light source;
   b. a refractometer cell comprising a reference fluid compartment for a fluid having a known index of refraction, said compartment having a light entry-end and a moveable retroreflector positioned at the end of said compartment opposite the light entry-end, and a sample fluid compartment having a light entry-end and a retroreflector positioned at the end of said compartment opposite the light entry-end, said sample fluid having an unknown index of refraction;
   c. means for moving the retroreflector within the reference fluid compartment;
   d. means for splitting the coherent light and passing separate beams through each of the fluid compartments and then combining the separate beams to form a single optical beam;
   e. means for spreading the single optical beam and projecting part of the fringe pattern thereof onto matched light detectors; and
   f. means for comparing and displaying the outputs from the matched light detectors to measure the difference in the optical refractive index of fluids in the compartments.

2. Apparatus as in claim 1 wherein the single optical beam is spread by optical means to form a more useful fringe pattern.

3. Apparatus as in claim 1 wherein the light detectors comprise a plurality of matched photocells.

4. Apparatus as in claim 3 wherein the photocells are matched and one pair is positioned on the opposite sides of at least one fringe pattern and another pair is positioned at the edges of the beam pattern.

* * * * *